(12) United States Patent
Berwald et al.

(10) Patent No.: US 7,258,759 B2
(45) Date of Patent: *Aug. 21, 2007

(54) SOFT MAGNETIC AMORPHOUS ELECTROMECHANICAL COMPONENT AND METHOD MAKING THE SAME

(75) Inventors: Thomas J. Berwald, Grand Haven, MI (US); Kendall Scott Page, Holland, MI (US)

(73) Assignee: Light Engineering, Inc., Indianapolis, IN (US)

( * ) Notice: Subject to any disclaimer, the term of this patent is extended or adjusted under 35 U.S.C. 154(b) by 481 days.

This patent is subject to a terminal disclaimer.

(21) Appl. No.: 10/876,034

(22) Filed: Jun. 24, 2004

(65) Prior Publication Data

US 2004/0250408 A1    Dec. 16, 2004

Related U.S. Application Data

(63) Continuation-in-part of application No. 10/763,728, filed on Jan. 23, 2004, which is a continuation-in-part of application No. 10/458,944, filed on Jun. 11, 2003, now Pat. No. 7,018,498.

(51) Int. Cl.
    *B32B 37/00* (2006.01)
(52) U.S. Cl. .................... 156/193; 156/191
(58) Field of Classification Search ............. 156/191, 156/193
    See application file for complete search history.

(56) References Cited

U.S. PATENT DOCUMENTS

| 2,293,951 A | 8/1942 | Seastone et al. |
| 2,495,167 A | 1/1950 | Horstman et al. |
| 2,554,262 A | 5/1951 | Nagel |
| 3,401,287 A | 9/1968 | French |
| 4,363,988 A * | 12/1982 | Kliman ............ 310/268 |
| 4,621,248 A | 11/1986 | Shigeta et al. |
| 5,028,830 A * | 7/1991 | Mas ............ 29/606 |
| 6,462,456 B1 | 10/2002 | DeChristofaro et al. |

(Continued)

FOREIGN PATENT DOCUMENTS

DE    4030124 A    3/1992

(Continued)

OTHER PUBLICATIONS

Decristofaro, Nicholas, Amorphous Metals in Electro-Power Distribution Applications, Materials Research Society, MRS Bulletin, vol. 23, No. 5, pp. 50-56 (1998).

(Continued)

*Primary Examiner*—Jeff H. Aftergut
(74) *Attorney, Agent, or Firm*—Ernest D. Buff & Associates, LLC; Ernest D. Buff; Gordon E. Fish

(57) ABSTRACT

A three dimensional soft magnetic metal mass suitable for milling is formed wrapping soft magnetic metal ribbon into a three dimensional shape and then applying adhesive to the three dimensional shape. The adhesive permeates the three dimensional shape. The adhesive is then cured. If the soft magnetic metal mass is made as a toroid, then it could be processed into an electro-mechanical component. The electro-mechanical component would then be suitable for use in very high frequency electric motors.

31 Claims, 3 Drawing Sheets

U.S. PATENT DOCUMENTS

| | | | |
|---|---|---|---|
| 6,559,570 B2 | 5/2003 | DeCristofaro et al. | |
| 7,018,498 B2* | 3/2006 | Berwald et al. | 156/193 |
| 7,144,468 B2* | 12/2006 | Decristofaro et al. | 156/185 |

FOREIGN PATENT DOCUMENTS

| | | |
|---|---|---|
| GB | 597218 A | 1/1948 |
| JP | 56104425 A | 8/1981 |

OTHER PUBLICATIONS

Rabinkin, Anatol, Brazing with amorphous foil performs, reprinted from Jun. 2001 issue of Advanced Materials & Processes.

Van Schevensteen, Raymond, et al, Energy Efficient Distribution Transformer Solutions, downloaded from www.metglas.com, Jun. 4, 2003.

Rabinkin, Anatol, Optimization of Brazing Technology, Structural Integrity and Performance of Multi-Channeled, Three Dimensional Metallic Structures, downloaded from www.metglas.com, Jun. 4, 2003.

Rabinkin, Anatol, Overview: Brazing With (NiCoCr)-B-Si Amorphous Brazing Filler Metals: Alloys, Processing Joint Structure, Properties, Applications, downloaded from www.metglas.com, Jun. 4, 2003.

* cited by examiner ically unsuccessful. Various manufacturing tech-
SOFT MAGNETIC AMORPHOUS ELECTROMECHANICAL COMPONENT AND METHOD MAKING THE SAME This application is a continuation-in-part of U.S. application Ser. No. 10/763,728, filed Jan. 23, 2004, which is a continuation-in-part of U.S. application Ser. No. 10/458,944, filed Jun. 11, 2003 (now U.S. Pat. No. 7,018,498).

BACKGROUND OF THE INVENTION

Multi-pole rotating electro-mechanical devices, such as motors, generators, re-gen motors, alternators, brakes and magnetic bearings are comprised of rotors and electro-mechanical components. AC motors rotate by producing a rotating magnetic field pattern in the electro-mechanical component that causes the rotor to follow the rotation of this field pattern. As the frequency varies, the speed of the rotor varies. To increase the speed of the motor, the frequency of the input source must be increased.

High frequency motors manufactured with the proper materials can be very efficient. For certain applications, like electric or hybrid cars, highly efficient electric motors are desirable.

The construction of electro-mechanical components for high frequency electric motors and generators is problematic. Iron or steel components are quite common in electric motors and generators. However, at high frequencies, such as those greater than 400 Hz, conventional iron or steel components are no longer practical. The high frequency of the AC source increases the core losses of the iron or steel components, reducing the overall efficiency of the motor. Additionally, at very high frequencies, the component may become extremely hot, cannot be cooled by any reasonably acceptable means and may cause motor failure.

For construction of electro-mechanical components used in high frequency electric motors, ribbon made from soft magnetic material provides distinct advantages. Examples of soft magnetic ribbon materials would be either 1) conventional material typically defined as 0.008" and thicker, non grain oriented with a typical Si content of 3%+/−½% or 2) alternate soft materials that are 0.007" or thinner with Si content of 3% to 7%, amorphous, or nanocrystalline alloys and other grain oriented or non grain oriented alloys. Some soft magnetic ribbon materials exhibit inherent characteristics that make their use in high frequency electro-mechanical rotating devices highly desirable. Some soft magnetic ribbons are easy to magnetize and demagnetize, which means an electro-mechanical component made with these metals would have low power loss, low temperature rise at high frequency, extremely fast magnetization and easy conversion of electrical to mechanical energy. An electro-mechanical component made of such a metal would generate less core losses and be able to operate at much higher frequencies, resulting in motors and generators of exceptional efficiency and power density.

Soft magnetic materials are commercially produced as ribbon or strip. A preferred example of a soft magnetic metal ribbon is Metglas®, which is an amorphous material, manufactured by Honeywell, Inc. Soft magnetic metal ribbons are very thin and of varying width. Manufacturing components of soft magnetic metal ribbon requires winding the soft magnetic ribbon into a shape and then heat processing the shape. Simple three dimensional shapes, such as toroids, can currently be constructed from soft magnetic metal ribbon.

However electro-mechanical components are often not simple three dimensional shapes. The electro-mechanical component can have numerous slots for accommodating motor coils in a generally toroidal structure.

Attempts to create complex three dimensional configurations from soft magnetic metal ribbon have heretofore been commercially unsuccessful. Various manufacturing techniques have been attempted by industry such as but not limited to: wire electrical discharge machining, electro-chemical creep grinding, conventional electrical discharge machining, cutting, stamping, acid etching and fine blanking. None have proven satisfactory for reasons such as cost-effectiveness, manufacturing repeatability, or process cycle time.

This inability to fabricate complex three dimensional shapes from soft magnetic ribbon has been the significant impediment to producing high efficiency axial flux motors and generators. A method to produce electro-mechanical components from soft magnetic ribbon in a cost effective, end use functional, high volume capable method that will also provide substantial design flexibility for end use requirements is highly desirable.

SUMMARY OF THE INVENTION

A method for forming a three dimensional soft magnetic metal mass suitable for milling consists of wrapping soft magnetic metal ribbon into a three dimensional shape, then applying adhesive to the three dimensional shape. The adhesive is then cured and the cured form is mechanically constrained in three dimensions. The method results in a soft magnetic metal mass which can withstand the mechanical stresses of machining. The three dimensional soft magnetic metal form can be milled using a horizontal mill, a vertical mill, a computer numeric control (CNC) machine, or any other common milling equipment. Thus, complex three dimensional soft magnetic metal shapes can be created.

The ability to create three dimensional soft magnetic metal shapes allows the use of soft magnetic metal for a variety of applications heretofore foreclosed by the mechanical characteristics of soft magnetic metal ribbon.

To manufacture a soft magnetic electro-mechanical component, soft magnetic metal ribbon is wound into a toroid. The toroid is then placed in a milling assembly. Adhesive is applied to the toroid, and then cured. The toroid is then milled into an electro-mechanical component shape, and then thermally processed into a electro-mechanical component.

These and other objects, advantages and features of the invention will be more readily understood and appreciated by reference to the detailed description of the drawings.

DETAILED DESCRIPTION OF THE DRAWINGS

Figure 1:
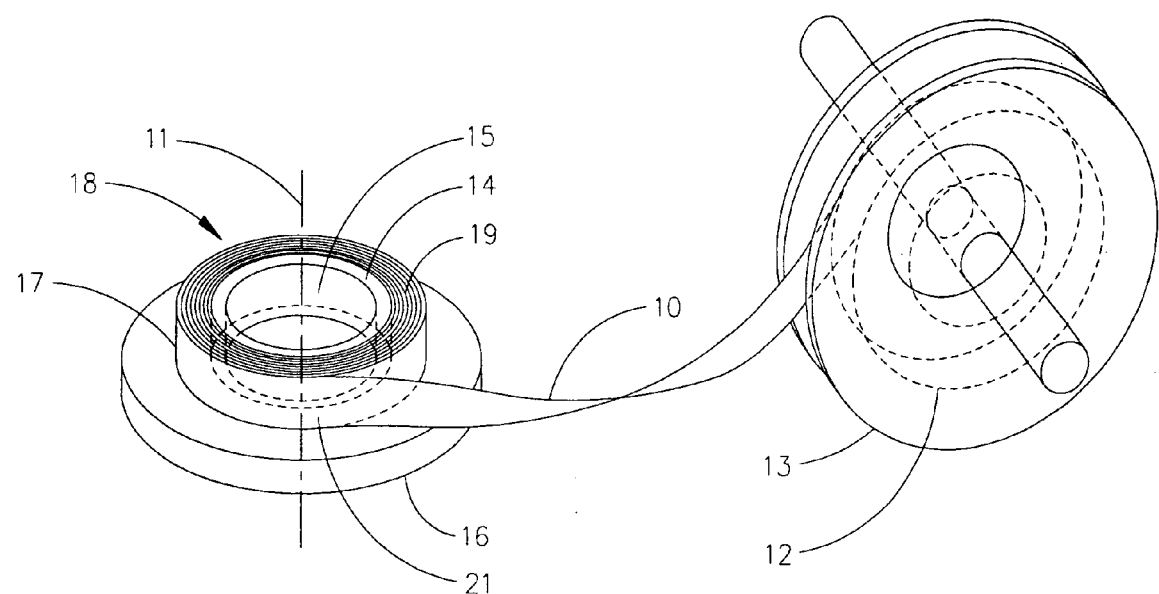
FIG. 1 shows a soft magnetic metal ribbon being wound on an inner ring.

FIG. 1 shows soft magnetic metal ribbon 10 being wound about a winding axis 11 on an inner ring 14. Winding machine 13 contains soft magnetic metal ribbon roll 12. Inner ring 14 is placed on winding plate 16. Soft magnetic metal ribbon 10 is wound on inner ring 14, forming soft magnetic metal toroid 18. Soft magnetic metal toroid 18 has an inner side surface 15, an outer side surface 17, a top 19, and a bottom 21.

While FIG. 1 shows the formation of a soft magnetic metal toroid 18, it will be appreciated that a three dimensional shape could be created with a geometry distinctly different from the soft magnetic metal toroid 18. For example, it would be possible by winding around four corners to create a rectangular prism.

Soft magnetic metal ribbon 10 can be wound using a variety of machines and methods. Preferably, a consistent, firm toroid will have at least an 85% wind density compared to the inherent ribbon density. Soft magnetic metal toroid 18 is then removed from winding plate 16. Soft magnetic metal ribbon 10 can be wound around the inner ring 14 while attached to the inner containment hat 20 as a single unit.

An adhesive is then applied to the soft magnetic ribbon toroid 18 in a manner to permeate the soft magnetic metal toroid 18. Inner ring 14 is still contained within the soft magnetic ribbon toroid 18. A suitable adhesive is Scotch Cast adhesive by 3M, diluted by acetone so as to achieve about a 20% mix by volume. The adhesive is applied to soft magnetic ribbon toroid 18 by an ambient atmospheric soak process. Soft magnetic ribbon toroid 18 is immersed in the adhesive until the adhesive infiltrates the layers.

Alternatively, the adhesive could be applied by immersing soft magnetic ribbon toroid 18 into the adhesive inside a vessel that is evacuated of air. The vacuum created would enhance the infiltration of the adhesive into the soft magnetic ribbon toroid 18 layers. Adhesive could also be applied to the soft magnetic ribbon during the winding process utilizing a wet spray or dry electrolytic deposition process. Alternative resins, epoxies or adhesives may be used. Different brands as well as different types of resins, epoxies or adhesives may be used. Heat cured epoxies that require various temperatures as well a two stage epoxies that cure at room temperature would also be suitable.

After soft magnetic ribbon toroid 18 is sufficiently infiltrated with adhesive, soft magnetic ribbon toroid 18 is allowed to drain. Once dry, soft magnetic ribbon toroid 18 is placed inside an oven for curing. Importantly, the temperature for heat treating the adhesive be a fraction of the temperature for heat processing soft magnetic metal ribbon 10. A preferable fraction is ½, although fractions of ¼ and ¾ might also be satisfactory.

Figure 2:
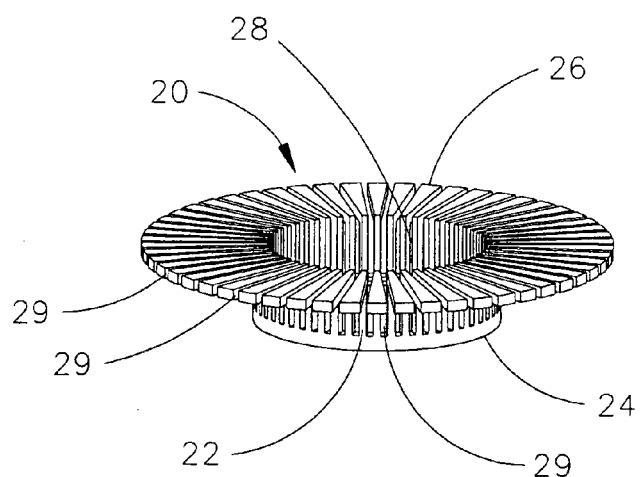
FIG. 2 shows an inner containment hat.

FIG. 2 shows inner containment hat 20. Inner containment hat 20 is a cylinder comprised of a number of columns 22 extending upward from the inner containment hat base 24. Fingers 26 extend outward from columns 22 at approximately a right angle. Fingers 26 increase in width as they extend further from the columns 22. Fingers 26 are arranged in a circle, forming an annulus 28. The columns 22 and fingers 26 form a plurality of inner containment hat grooves 29. Columns 22 of inner containment hat 20 are placed inside inner ring 14.

The height of columns 22 is approximately equal to the height of the soft magnetic metal toroid 18. The diameter of the soft magnetic metal toroid 18 is about equal to the diameter of the annulus 28.

Figure 3:
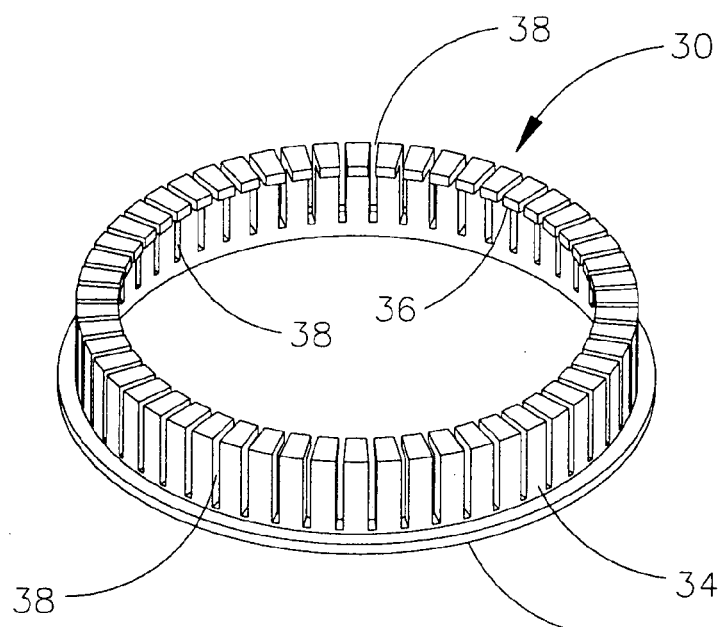
FIG. 3 shows an outer containment hat.

Following the placement of inner containment hat within soft magnetic metal toroid 18, outer containment hat 30 shown in FIG. 3, is placed around soft magnetic metal toroid 18.

Outer containment hat 30 is cylindrical, with a base 32. Bars 34 extend upward from base 32. At the top of each bar 34 is a lug 36 extending inward. Lug 36 for each bar 34 forms a flange for securing the amorphous metal toroid 18 within outer containment hat 30. Bars 34 and lugs 36 form a plurality of outer containment hat grooves 38.

Figure 4:
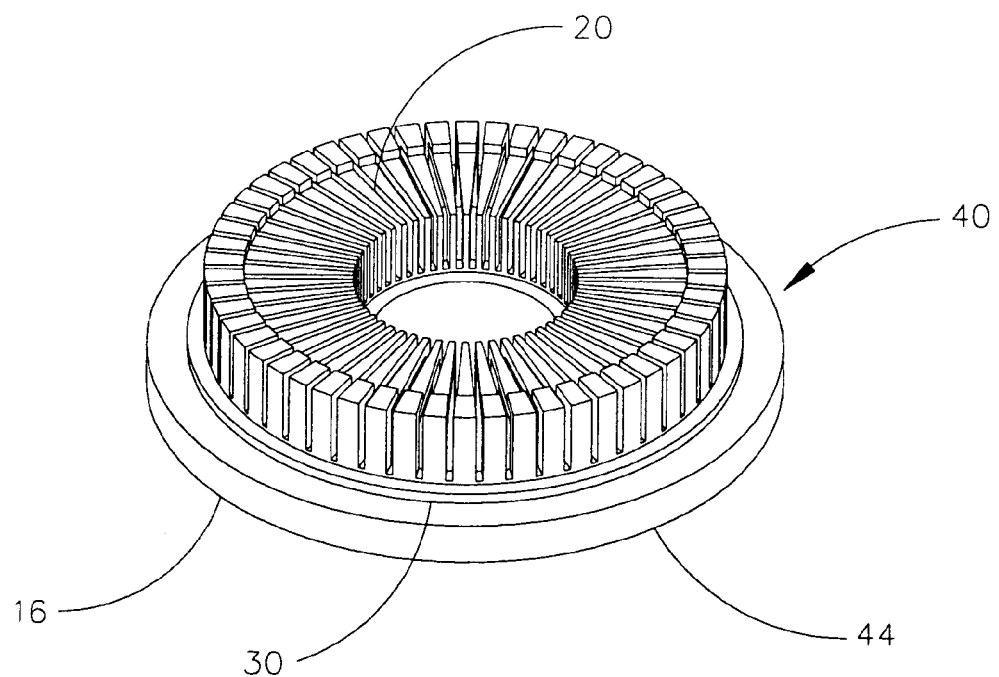
FIG. 4 shows a milling assembly.

Milling assembly 40, shown in FIG. 4, is then formed. Soft magnetic metal toroid 18, still containing inner ring 14, along with the inner containment hat 20 is placed within outer containment hat 30. Lugs 36 and fingers 26 are aligned. Milling assembly 40 contains the soft magnetic metal toroid 18 within a toroidal geometry. Alternatively, soft magnetic metal toroid 18 could be placed within outer containment hat 30 and inner containment hat 20 prior to treatment with the adhesive.

After application of the adhesive and placement within the mechanical constraints of the inner ring 14, inner containment hat 20, and outer containment hat 30, the soft magnetic metal toroid 18 has sufficient structural integrity to withstand the stresses of milling.

Milling plate 44 is placed on the bottom of the soft magnetic metal toroid 18. Milling plate 44 could be the same as winding plate 16.

Soft magnetic metal toroid 18, having been treated with an adhesive, is thus firmly contained within a structure, allowing soft magnetic metal toroid 18 to be milled and formed in three dimensions. Complex shapes can thus be constructed from the metal ribbon toroid 18, allowing structures such as electro-mechanical components to be made from the soft magnetic metal toroid 18.

Figure 5:
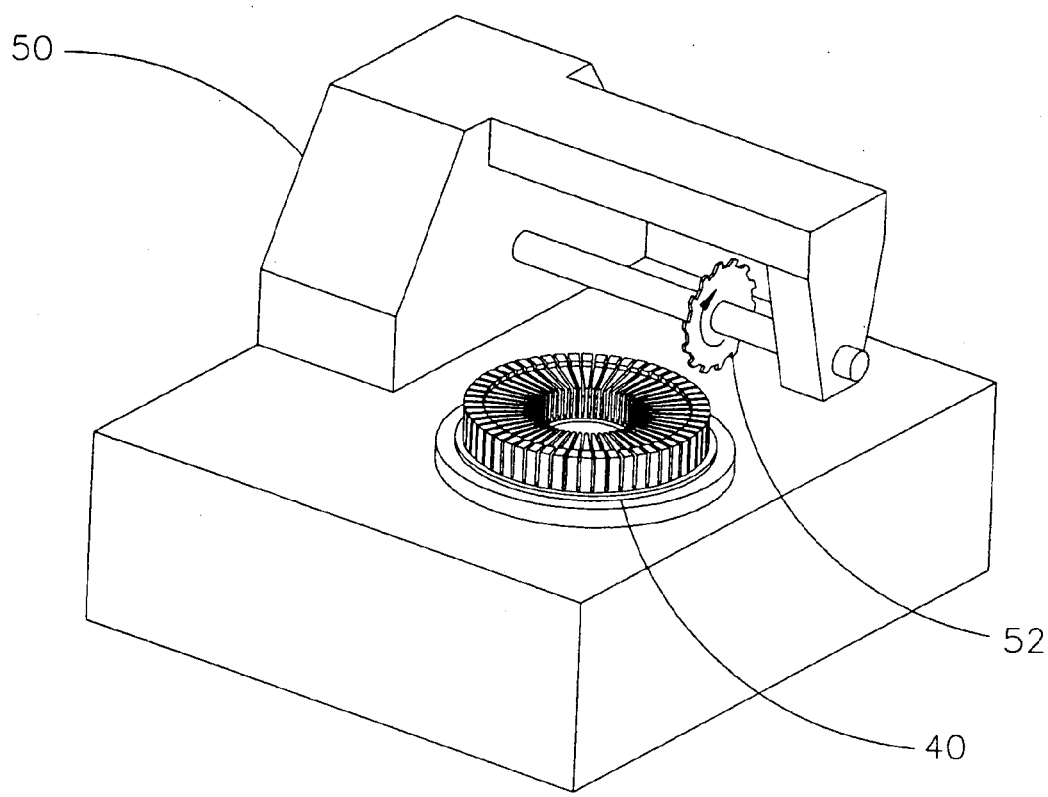
FIG. 5 shows a milling assembly being milled.

As illustrated by FIG. 5, milling assembly 40 is placed in mill 50. Mill 50 could be a horizontal mill, a vertical mill, a CNC machine, or any other type of mill. However, mill 50 should preferably have the axis of rotation of the mill tools 52 perpendicular to the axis of the soft magnetic metal toroid 18. By having the axis of rotation of the mill tool 52 perpendicular to the axis of the soft magnetic metal toroid 18, the depth and width of the slots milled into the soft magnetic metal toroid 18 can be finely controlled.

Mill 50 cuts slots or other geometries into the soft magnetic metal toroid 18. Inner ring 14, still contained within soft magnetic metal toroid 18, acts as a positive mechanical stop for the inside edge of soft magnetic metal toroid 18. Inner ring 14, in conjunction with the epoxy, does not allow strips of soft magnetic metal ribbon 10 to separate during machining, thereby producing clean and accurate cuts.

After the soft magnetic metal toroid 18 is milled into an electro-mechanical component shape, milling assembly 40 is removed from mill 50. Milling assembly 50 is then thermally processed in accordance with the recommendations of the manufacturer of soft magnetic metal ribbon 10 as required. If the amorphous metal ribbon 10 is Metglas®, thermal processing consists of placing milling assembly 50 into a vacuum furnace at 695 degrees Fahrenheit for approximately sixty minutes. The thermal processing could also be performed as a magnetic field is applied to produce a favorable nano-crystalline orientation to minimize losses. Some soft magnetic ribbon materials require thermal processing to achieve the desired magnetic properties while others require thermal processing to properly relieve the stresses in the milled electro-mechanical component shape as a result of the milling process. It is conceivable that, given proper mechanical containment during milling, some materials that do not require thermal processing for magnetic properties could forego the thermal processing.

Figure 6:
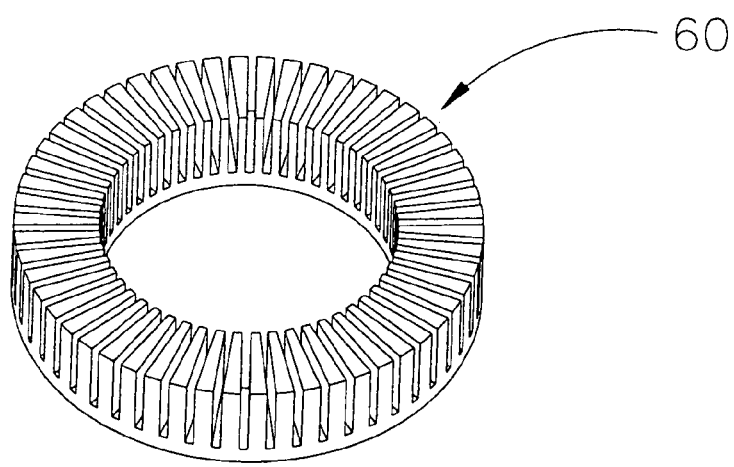
FIG. 6 shows a soft magnetic metal electro-mechanical component.

Following thermal processing, the milling assembly 40 is disassembled by removing retainer 42, outer containment 30, inner containment hat 20, and inner ring 14. Soft magnetic metal toroid 18 has thus been made into an soft magnetic metal electro-mechanical component 60, shown in FIG. 6.

The method as described allows for the creation of three dimensional forms from soft magnetic metal ribbon. The applications for such three dimensional forms could be as electro-mechanical components for a variety of machines.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A method for manufacturing a soft magnetic metal electro-mechanical component comprising the steps of:
    winding soft magnetic metal ribbon into a toroid;
    containing the toroid within a milling assembly prior to any milling;
    applying an adhesive to the toroid;
    curing the adhesive; and
    following the winding, containing, applying, and curing steps,
        milling the toroid into an electro-mechanical component shape;
        applying a magnetic field to the toroid; and
        thermally processing the electro-mechanical component shape into an electro-mechanical component.

2. The method of claim 1 where the step of applying adhesive to the toroid includes the steps of:
    providing a vessel containing the adhesive;
    immersing the toroid in the adhesive; and
    evacuating the vessel.

3. The method of claim 1 where the step of applying the adhesive comprises an ambient atmospheric soak process.

4. The method of claim 1 where the step of applying the adhesive comprises a wet spray process applied during winding.

5. The method of claim 1 where the step of applying the adhesive comprises an electrolytic deposition process during winding.

6. The method of claim 1 including the step of: removing the toroid from the milling assembly.

7. The method of claim 1 where the toroid has an inner side surface, an outer side surface, a top and a bottom.

8. The method of claim 1 where the step of containing the toroid within a milling assembly comprises placing an inner ring circumferentially about at least a portion of the inner side surface.

9. The method of claim 1 where the step of containing the toroid within a milling assembly comprises placing an outer ring circumferentially about at least a portion of the outer side surface.

10. The method of claim 1 where the step of containing the toroid within a milling assembly comprises placing a hat on at least a portion of the top.

11. The method of claim 1 where the step of containing the toroid within a milling assembly comprises placing a base on at least a portion of the bottom.

12. The method of claim 1 where the step of containing the toroid within a milling assembly comprises the steps of:
    placing an inner ring circumferentially about at least a portion of the inner side surface;
    placing an outer ring circumferentially about at least a portion of the outer side surface; and
    placing a hat on at least a portion of the top.

13. The method of claim 12 where the inner ring is placed about substantially all of the inner side surface.

14. The method of claim 12 where the outer ring is placed about substantially all of the outer side surface.

15. The method of claim 12 where the hat is placed about substantially all of the top.

16. The method of claim 12 where a milling plate is placed about substantially all of the bottom.

17. The method of claim 13 including the step of providing milling grooves within the milling assembly.

18. The method of claim 12 where the hat and the outer ring are integral.

19. The method of claim 12 where the hat, outer ring and inner ring are integral.

20. The method of claim 19 where the toroid has a winding axis, and the step of milling the toroid into a toroid shape consists of milling the toroid primarily in an axis perpendicular to the winding axis.

21. The method of claim 20 where the where the hat and outer ring have slots, and the step of milling the toroid into an electro-mechanical component shape includes milling through the slots.

22. The method of claim 19 where the hat and outer ring have slots, and the step of milling the toroid into an electro-mechanical component shape includes milling through the slots.

23. The method of claim 19 where the toroid has a winding axis, and the step of milling the toroid into an electro-mechanical component shape consists of milling the toroid with the cutting tool rotating exclusively in an axis perpendicular to the winding axis.

24. The method of claim 12 including the step of placing a retainer around the outer ring to secure the toroid within the milling assembly.

25. The method of claim 1 where the toroid has a ribbon winding axis, and the step of milling the toroid into a toroid shape consists of milling the toroid primarily in an axis perpendicular to the winding axis.

26. The method of claim 1 where the toroid has a winding axis, and the step of milling the toroid into a toroid shape consists of milling the toroid exclusively in an axis perpendicular to the winding axis.

27. A method for manufacturing a soft magnetic metal electro-mechanical component comprising the steps of:
    winding soft magnetic metal ribbon about a winding axis into a toroid, the toroid having an inner side, an outer side, a top and a bottom;
    placing an inner ring on the inner side;
    placing an inner containment hat on the top and inner side;
    placing an outer containment hat on the top and outer side;
    placing a retainer around the outer containment hat;
    all placing steps being carried out prior to any milling;
    applying adhesive to the toroid;
    curing the adhesive; and
    following the preceding steps.
        milling the toroid into an electro-mechanical component shape;
        applying a magnetic field to the toroid; and
        thermally processing the electro-mechanical component shape into an electro-mechanical component.

28. The method of claim 27 where the inner containment hat has a plurality of inner containment hat slots and the outer containment hat has a plurality of outer containment hat slots, and the step of milling the toroid into a electromechanical component shape comprises milling through the inner containment hat slots and the outer containment hat slots.

29. The method of claim 28 including a step of aligning the inner containment hat slots and the outer containment hat slots.

30. The method of claim 27 where the step of milling the toroid into an electro-mechanical component shape occurs with the cutting tools rotating primarily on an axis perpendicular to the winding axis.

31. The method of claim 27 where the step of milling the toroid into an electro-mechanical component shape occurs with the cutting tools rotating exclusively on an axis perpendicular to the winding axis.

* * * * *